United States Patent [19]
Shichijyo et al.

[11] Patent Number: 5,994,802
[45] Date of Patent: Nov. 30, 1999

[54] AC GENERATOR FOR VEHICLE

[75] Inventors: Akiya Shichijyo, Ama-gun; Shin Kusase, Obu, both of Japan

[73] Assignee: Denso Corporation, Kariya, Japan

[21] Appl. No.: 08/722,882

[22] Filed: Sep. 26, 1996

[30] Foreign Application Priority Data

Sep. 27, 1995 [JP] Japan ................................. 7-249025
Sep. 13, 1996 [JP] Japan ................................. 8-243417

[51] Int. Cl.⁶ ................................................... H02K 1/22
[52] U.S. Cl. .......................... 310/51; 310/263; 310/261; 310/156
[58] Field of Search ............................ 310/51, 198, 263, 310/680, 156, 258

[56] References Cited

U.S. PATENT DOCUMENTS

| | | | |
|---|---|---|---|
| 4,028,572 | 6/1977 | Baltisberger | 310/201 |
| 4,959,577 | 9/1990 | Radomski | 310/263 |
| 5,122,705 | 6/1992 | Kusase et al. | 310/68 D |
| 5,306,977 | 4/1994 | Hayashi | 310/263 |
| 5,343,105 | 8/1994 | Sakabe et al. | 310/179 |
| 5,455,500 | 10/1995 | Shichijyo et al. | 322/90 |

FOREIGN PATENT DOCUMENTS 5-344696  12/1993  Japan.

*Primary Examiner*—Nestor Ramirez
*Assistant Examiner*—Judson H. Jones
*Attorney, Agent, or Firm*—Pillsbury Madison & Sutro LLP

[57] ABSTRACT

A stator winding is composed of a first and second of three-phase windings. Each of them has three separate Y-connected or Δ-connected coils which are wound on the teeth of the stator core at a $2\pi/3$ short pitch. The second three-phase winding is shifted from the first winding by $\pi/3$ radian in the electric angle which is one tooth pitch.

4 Claims, 16 Drawing Sheets

AXEL DIRECTION

FIG. 8
PRIOR ART
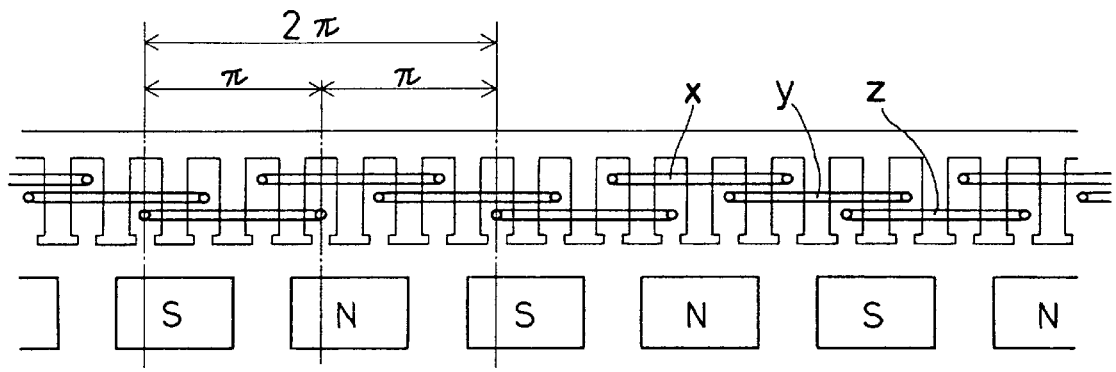
FIG. 9
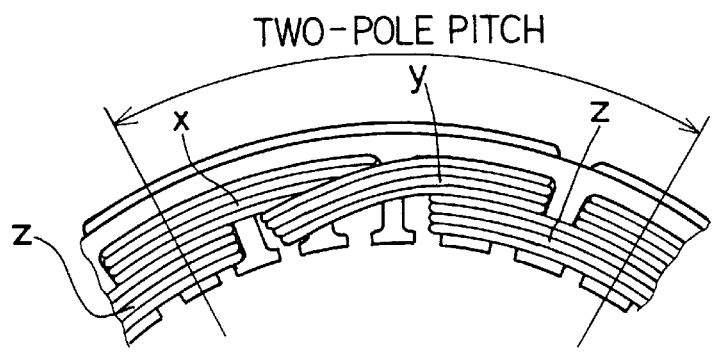
FIG. 10
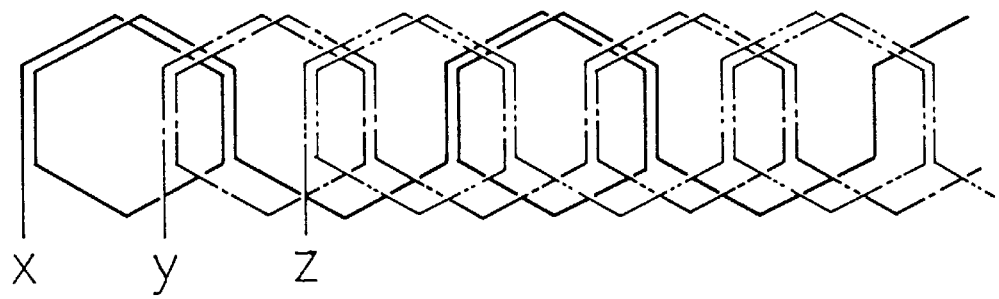
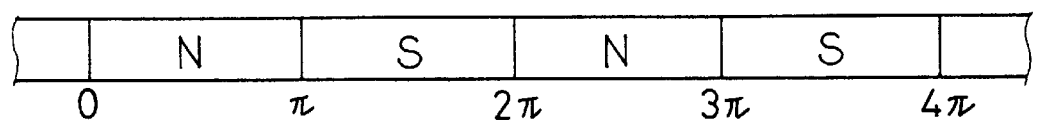

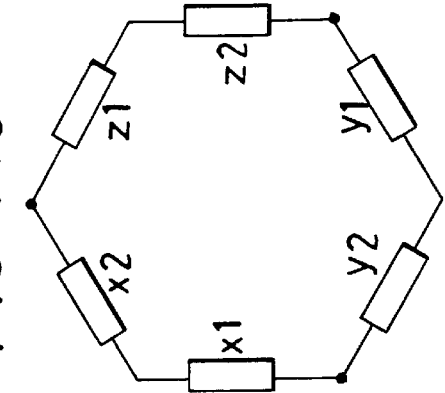
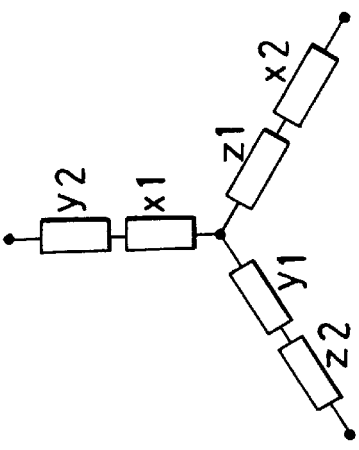
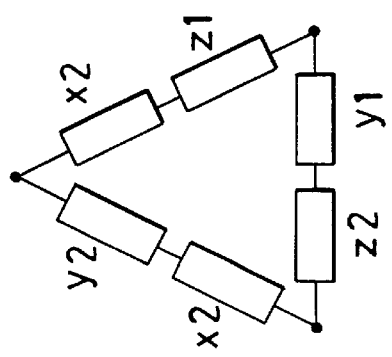
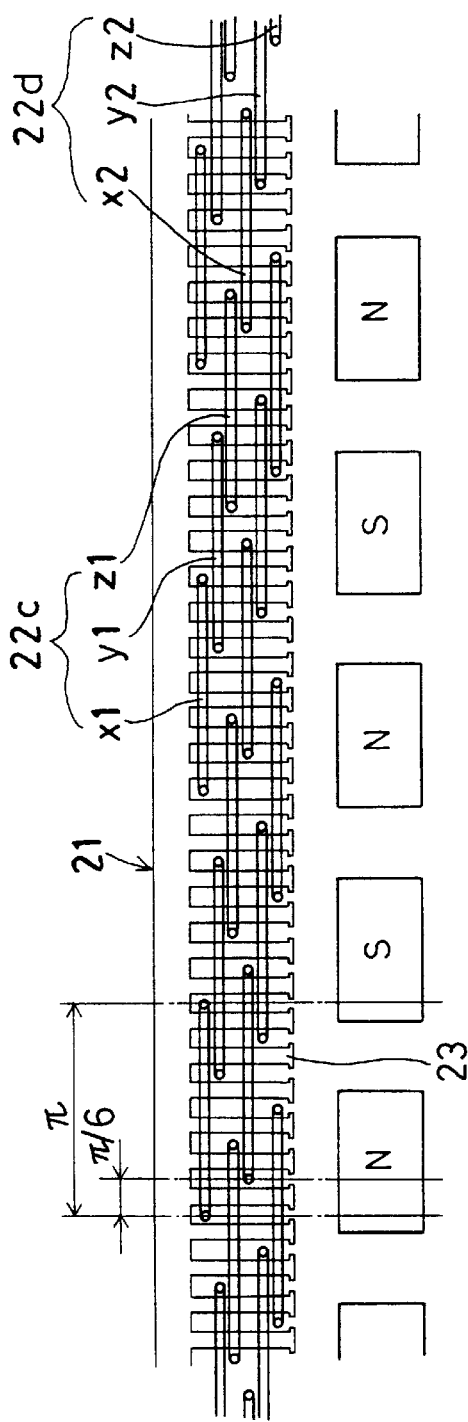

FIG. 16A
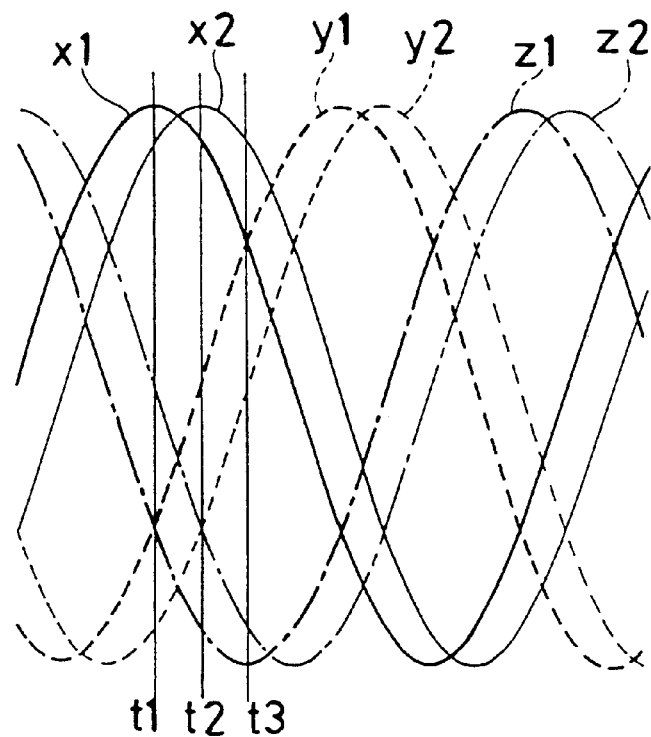
FIG. 16B
(t = t1)
FIG. 16C
(t = t2)
FIG. 16D
(t = t3)
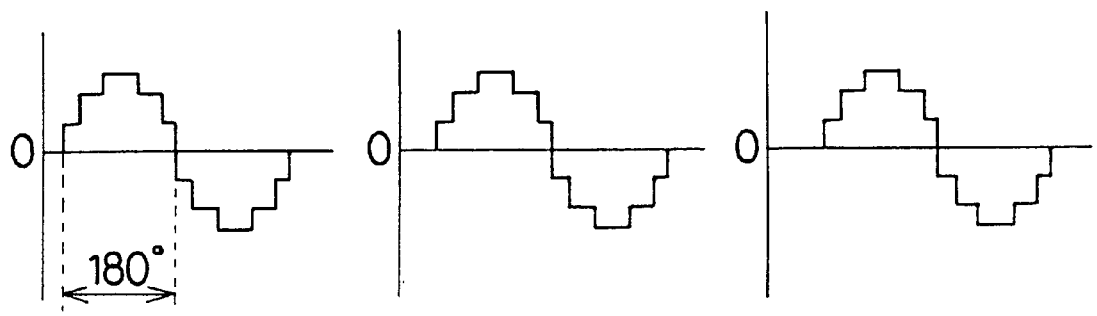

AC GENERATOR FOR VEHICLE

BACKGROUND OF THE INVENTION

1. Field of the Invention

The present invention relates to an AC generator for a vehicle which supplies three-phase AC power driven by an engine.

2. Description of the Related Art

It is well-known that in a conventional AC generator which has a field rotor with a Lundell-type pole core and a field coil, permanent magnets are disposed on the circumference of the Lundell-type pole core between the adjacent claw pole pieces thereof, for example, as disclosed in U.S. Pat. No. 4,959,577. The permanent magnets is polarized in a direction opposite to the pole of the leakage flux between the claw pole pieces to reduce the leakage flux and increase the effective flux, thereby increasing the output power of the generator.

However, such a generator has the following problems.

First, because the permanent magnets are disposed opposite ends of the pole core, the effect of the permanent magnet is obtained in the direction of the rotation. As a result, the distribution of the magnetic flux of the pole piece forms into a non-sinusoidal wave which includes higher harmonics as shown in FIG. 23. Therefore, higher harmonics in the current induced in the stator winding is generated to cause an electric noise and a magnetic noise generated by the higher harmonics of the current, causing a problem of such a rotor with the permanent magnets.

Second, in the above rotor with the permanent magnets, demagnetizing force of the armature reaction as well as the magnetomotive force of the field coil reduces the magnetic coercive force of the permanent magnets.

Third, because the permanent magnets are disposed near the outer circumference of the rotor having the Lundell-type pole core with the permanent magnets between the claw pole pieces, they are subject to change in the magnetomotive force of the stator winding as shown in FIGS. 24A–24D. As a result, the permanent magnets are demagnetized, reducing the output power of the generator. In addition, the pole pieces are heated by the magnetic disturbance, resulting in reduction of the output power and in demagnetizing permanent magnet made of a high performance magnetic material such as rare earth metal.

Forth, because a portion of the flux is supplied to the stator core by the permanent magnets even when the field coil is not excited and any load is connected, the output voltage exceeds the battery voltage as shown in FIG. 25 if the magnetic flux is large in a high rotational speed range of the generator, resulting in overcharging of the battery.

In general, the electromagnetic noise is mainly caused by the higher harmonics included in the distribution of magnetomotive force. Therefore, it is necessary to reduce the higher harmonics of the magnetomotive force.

It is necessary to reduce the armature reaction in order to prevent the demagnetization of the permanent magnets. It is also necessary to reduce the change in the distribution of the magnetomotive force in order to reduce the magnetic disturbance.

In order to solve the problem of the over-charging of the battery, it is necessary to reduce the voltage including higher harmonics generated by the flux of permanent magnet at the no-load operation.

SUMMARY OF THE INVENTION

The present invention is made in view of the above described situation, and an object thereof is to provide an improved AC generator for a vehicle having a Lundell-type core with claw pole pieces and permanent magnets therebetween in which the higher harmonics of the magnetomotive force as well as the basic component of the magnetomotive force is drastically reduced, thereby reducing the electric noise and magnetic noise.

Another object of the present invention is to prevent demagnetizing of the permanent magnets.

A further object of the present invention is to reduce the excessive voltage caused by the permanent magnets and to increase the output power.

According to the present invention, the coil pitch of the stator winding is shorter than the pole pitch. In other words, the stator has short-pitch coils. Therefore, the higher harmonics included in the magnetomotive force is reduced. Although the magnetic flux of the rotor includes the higher harmonic, the electric noise in the current generated in the stator winding is reduced. The reduction in the higher harmonics included in the current reduces the higher harmonics included in the magnetomotive force which causes the magnetic noise.

By reducing the power and higher harmonics generated in the stator winding, the demagnetizing force of the rotor and, particularly, the permanent magnets, is reduced, thereby preventing the permanent magnets from being demagnetized.

In the no load operation, the voltage generated in the stator winding is reduced and the excessive voltage caused by the permanent magnets is prevented.

Preferably, the stator winding has short-pitch coils having a pitch which is ⅔ of the pole pitch, thereby reducing the harmonics, particularly, the third harmonic wave which is the main harmonic wave to nearly zero and electric noise substantially.

The lap-wound short-pitch coils of the stator winding have short wires and, therefore, small electric resistance, suppressing the temperature rise. In addition, because two coil-sides of different coils are inserted in the same slot and the coil ends thereof are disposed opposite to one another, the two coils do not overlap with one another at the coil ends. As a result, the coil ends are made shorter and the temperature rise is limited, thereby reducing the temperature rise of the rotor and, particularly, the permanent magnets.

Because a plurality of coils is disposed in the stator core at a certain phase difference, it is possible to reduce the change in the distribution of the magnetomotive force which is composed of a plurality of magnetomotive force generated by a plurality of coils. Therefore, the higher harmonics and, accordingly, the magnetic noise can be reduced.

More preferably, a second three-phase stator winding having short-pitch coils is provided so that each coil of the second stator winding is disposed at π/3 rad in the electric-phase-angle from each coil of the first three-phase stator winding. Therefore, in case of the generator having coils of the two three-phase windings disposed at 2 π/3 pitch, change in the distribution of the magnetomotive force is reduced substantially.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

FIG. 8 is a schematic diagram of a stator winding (Prior Art);

FIG. 9 is a side view of the stator winding (Prior Art);

FIG. 10 is a schematic diagram of the stator winding (Prior Art);

FIGS. 14A, 14B and 14C are schematic diagrams showing types of the coil connection;

FIG. 15 is a schematic diagram of the stator winding (Second Embodiment);

FIG. 16A, 16B, 16C and 16D are graphs showing changes in the magnetic flux (Second embodiment);

DETAILED DESCRIPTION OF THE PREFERRED EMBODIMENTS

An AC generator according to the present invention is described with reference to appended drawings.

First Embodiment

Figure 4:
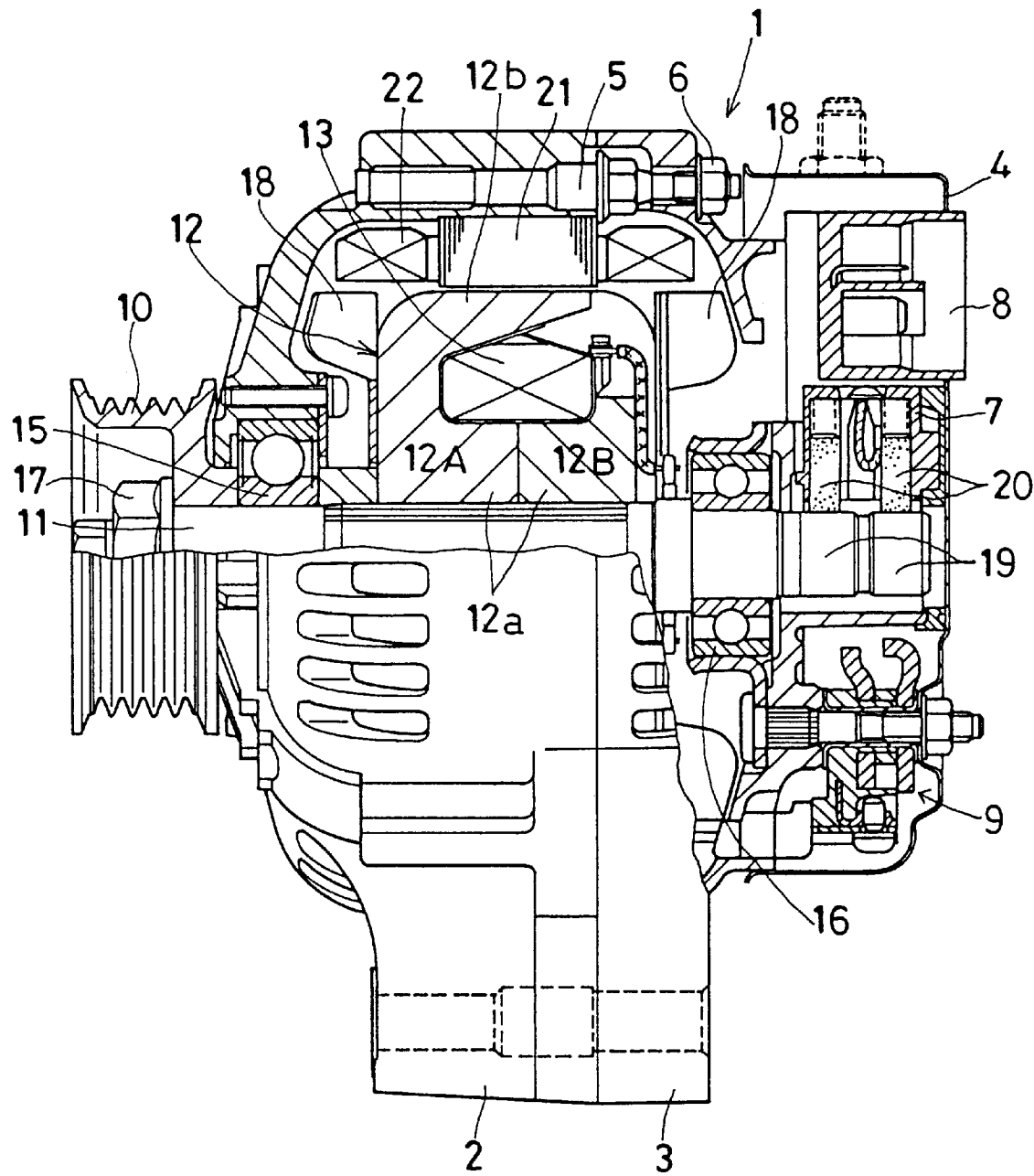
FIG. 4 is a cross-sectional side view of an AC generator.

An AC generator 1 according to a first embodiment (hereinafter referred to as the generator 1) has, as shown in FIG. 4, a cover composed of a front frame 2 and a rear frame 3, and a rear end cover 4 covering the rear frame 3, an assembly of rotor and a stator which is enclosed and held by the front frame 2 and the rear frame 3.

The front frame 2 and the rear frame 3 are made of aluminum die-cast and combined with each other at the outer fringe thereof and fastened by stud bolts 5 and nuts 6.

The rear end cover 4 covers various parts and components fixed to the outer surface of the rear frame 3 including a brush holder 7, a voltage regulator 8 and a rectifying unit 9.

The rotor is composed of a shaft 11 which is driven by an engine through a pulley 11, a field core 12 having a pair of pole cores 12A and 12B press-fitted to the outer periphery of the shaft 11, a field coil 13 wound in the field core 12 and a plurality of permanent magnets fixed to the field core 12.

The shaft 11 is rotatably supported by the front and rear frames 2 and 3 via two bearings 15 and 16. The pulley 10 is fitted to an end of the shaft 11 extending forward from the front frame 2 and is fastened to the shaft 11 by a lock nut 17.

Each of the pole cores 12A and 12B of the field core 12 has a cylindrical boss 12a and a plurality (six in this embodiment) of claw pole pieces 12b formed on the periphery of the boss 12a with the two bosses 12a fitted into the field coil 13 so that the claw pole pieces 12b of one pole core are in mesh with the claw pole pieces of the other pole core.

A cooling fan 18 for generating cooling air when rotating with the rotor is fixed to each axial end of the pole cores 12A and 12B by welding or bolt-fastening.

The field coil 13 is connected electrically to slip rings 19. The field current is supplied thereto from a battery (not shown) through brushes 20 which slide on the outer peripheries of the slip rings. When the field current is supplied to the field coil 13, the pole pieces 12b of one of the pole core (e.g. 12A) are magnetized to the S-pole and the pole pieces 12b of the other (e.g. 12B) are magnetized to the N-pole.

The permanent magnets 14 are disposed on a circumference of the pole cores between adjacent claw pole pieces and are fixed by bonding. They are magnetized to have the same polarity as the claw pole pieces adjacent thereto (the permanent magnet 14 is omitted in FIG. 3).

The stator 14 is composed of a stator core 21 which is press-fitted into the inner periphery of the front frame 2 and a stator winding 22 wound in the stator core 21.

Figure 1:
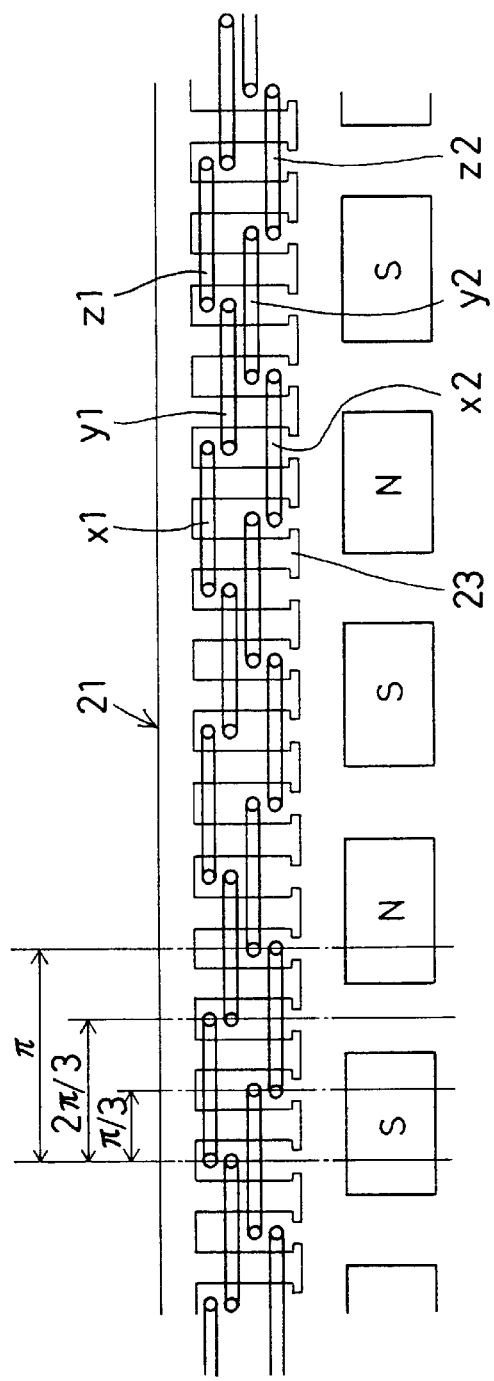
FIG. 1 is a schematic diagram of a stator winding.
Figure 2:
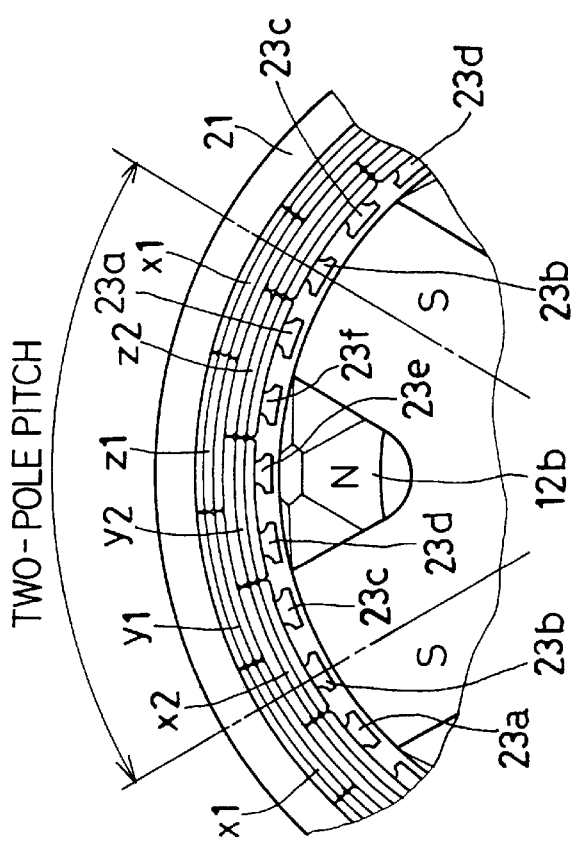
FIG. 2 is a side view of the stator winding.
Figure 3:
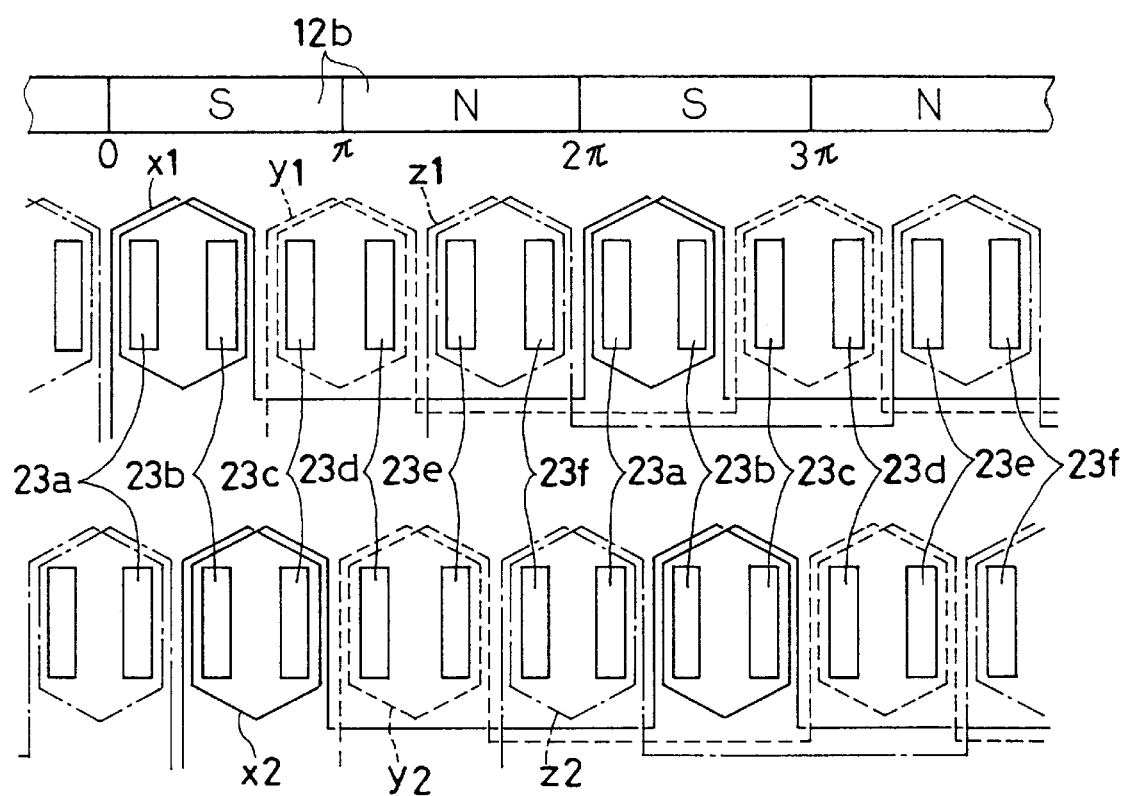
FIG. 3 is a diagram of the stator winding.

The stator core 21 is composed of cylindrical laminated sheets of steel and disposed around the claw pole pieces 12b. The stator core 21 has teeth 23 (23a–23f) at even intervals in the inner periphery thereof at a rate of six teeth per each two-pole pitch of the field core 12 as shown in FIGS. 1 to 3.

The stator coil 22 is composed of a pair of three-phase windings (a first three-phase winding 22a and a second three-phase winding 22b), which have respective three coils of Y-connection or Δ-connection x1, y1, z1 and x2, y2, z2. Those coils are wound around the teeth 23 of the stator core 21 in the 2 π/3 short-pitch winding. For example, a combination of both Y-connected coils of the first three-phase winding and Y-connected coils of the second three-phase winding or a combination of both Δ-connected coils of the first three-phase winding and Δ-connected coils of the second three-phase winding can be connected to a single rectifying bridge circuit. On the other hand, a combination of Y-connected coils and Δ-connected coils of the stator windings can be connected to two rectifying bridge circuits.

Each of the first phase coils x1 of the first three-phase winding 22a is wound around a couple of teeth 23a and 23b and located between each series of four teeth four teeth 23c–23f. Likewise, each of the second phase coils y1 is wound around a couple of teeth 23c and 23d located between each series of four teeth 23e–23b. Finally, each of the third phase coils is wound around a couple of teeth 23e and 23f located between each series of four teeth 23a–23d.

Each of the first, second and third phase coils x2, y2 and z2 is shifted from each of the phase coils x1, y1 and z1 of the second tree-phase winding 22b by π/3 radian in the electric angle, in other words, by one tooth pitch. That is, each of the first phase coils x2 is wound around a couple of teeth 23b and 23c located between each series of four teeth 23d–23a, each of the second phase coils y2 is wound around a couple of teeth 23d and 23e located between each series of four teeth 23f–23c and, finally, each of the third phase coils z2 is wound around a couple of teeth 23f and 23a located between each series of four teeth 23b–23e.

Figure 5:
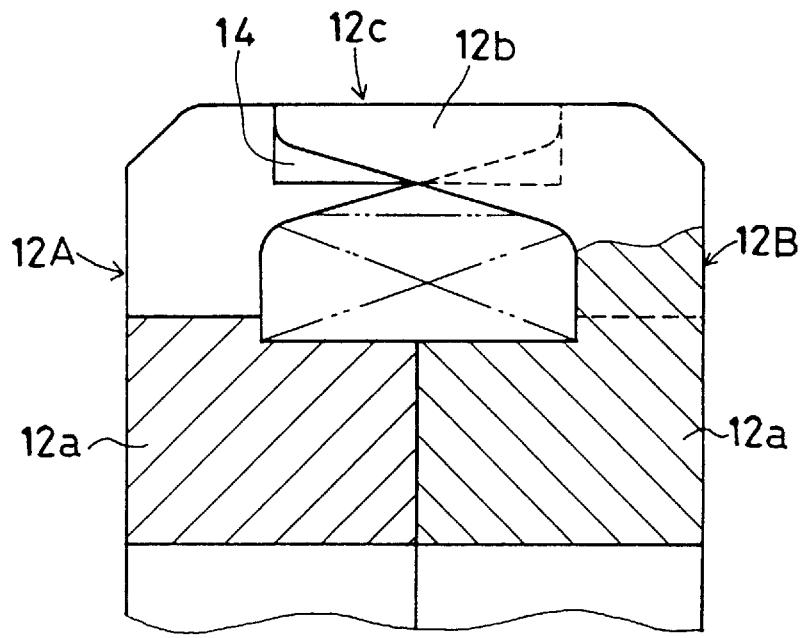
FIG. 5 is a cross-sectional side view of a field core.
Figure 6:
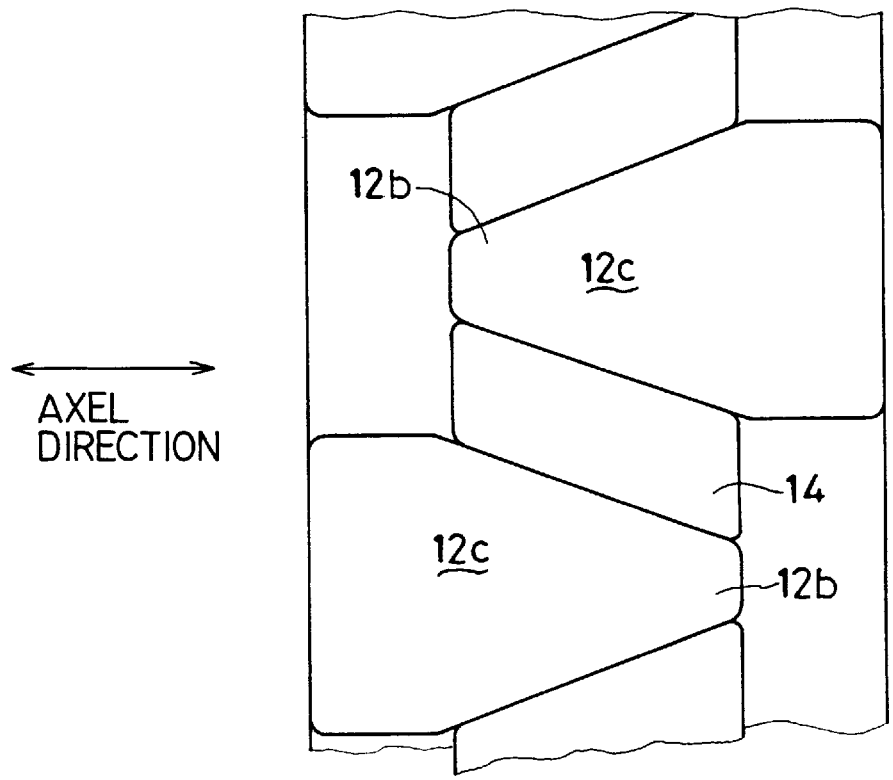
FIG. 6 is a plan view of claw pole pieces.

When an engine rotation is transmitted through a V-belt (not shown) to the pulley 10, the rotor rotates together with the shaft 11. When the field coil 13 is supplied with a field current from a battery through the brushes 20 and the slip rings 19, the claw pole pieces 12b of one of the pole core (e.g. 12A) is magnetized to the S-pole and the claw pole pieces 12b of the other pole core (e.g. 12B) is magnetized to the N-pole. Consequently, a rotating magnetic field is supplied to the stator winding 22, and three-phase AC voltage is generated in the stator winding 22. The output voltage of the stator winding 22 is rectified by the rectifying unit 9 to charge the battery and energize electric loads of a vehicle. In the generator 1, the permanent magnets 14 are disposed in the rotational direction of the field core 12 between adjacent ones of the claw pole pieces 12b. Therefore, the leakage magnetic flux between the claw pole pieces is reduced substantially and increases the effective magnetic flux supplied from outer peripheries 12c of the pole pieces 12b (shown in FIGS. 5 and 6) to the stator core 21 no less than the amount of the leakage flux. The higher harmonics and, particularly, the third harmonic wave in the current generated in the stator winding 22 is substantially reduced and the second and fourth harmonic waves (which cause fluctuation of the rotation) included in magnetomotive force of the armature reaction generated in the stator winding 22 are also eliminated.

The third harmonic wave (which is the main component of the harmonics) of magnetomotive force of the armature reaction is also reduced substantially. The change of a composite of the magnetomotive forces acting on the permanent magnets 14 is also reduced.

In the generator 1, the resistance of the coils per phase is reduced to $2/3$ of the resistance of the coils per phase of the conventional generator having the full-pitch winding shown in FIGS. 8–10. Therefore, Joule heat is reduced and the temperature rise of the stator winding 22 is reduced. The respective coil ends of two coils disposed in the same slot, which are x1 and y1, y1 and z1, z1 and x1, x2 and y2, y2 and z2, and z2 and x2, separate from each other in the opposite directions. Therefore, the coil ends are small and the temperature rise of the stator winding 22 is reduced.

A plurality of U-shaped grooves is defined by the edge of the claw poles 12b, the permanent magnets 14 and the shoulder portions of the pole cores 12A or 12B. They functions as a cooling fan. The permanent magnets 14 smooth the outer periphery of the field core 12, reducing the wind-cutting noise.

Connection of the first three-phase winding 22a, the second three-phase winding 22b and the rectifying unit 9 is described next.

Figure 11:
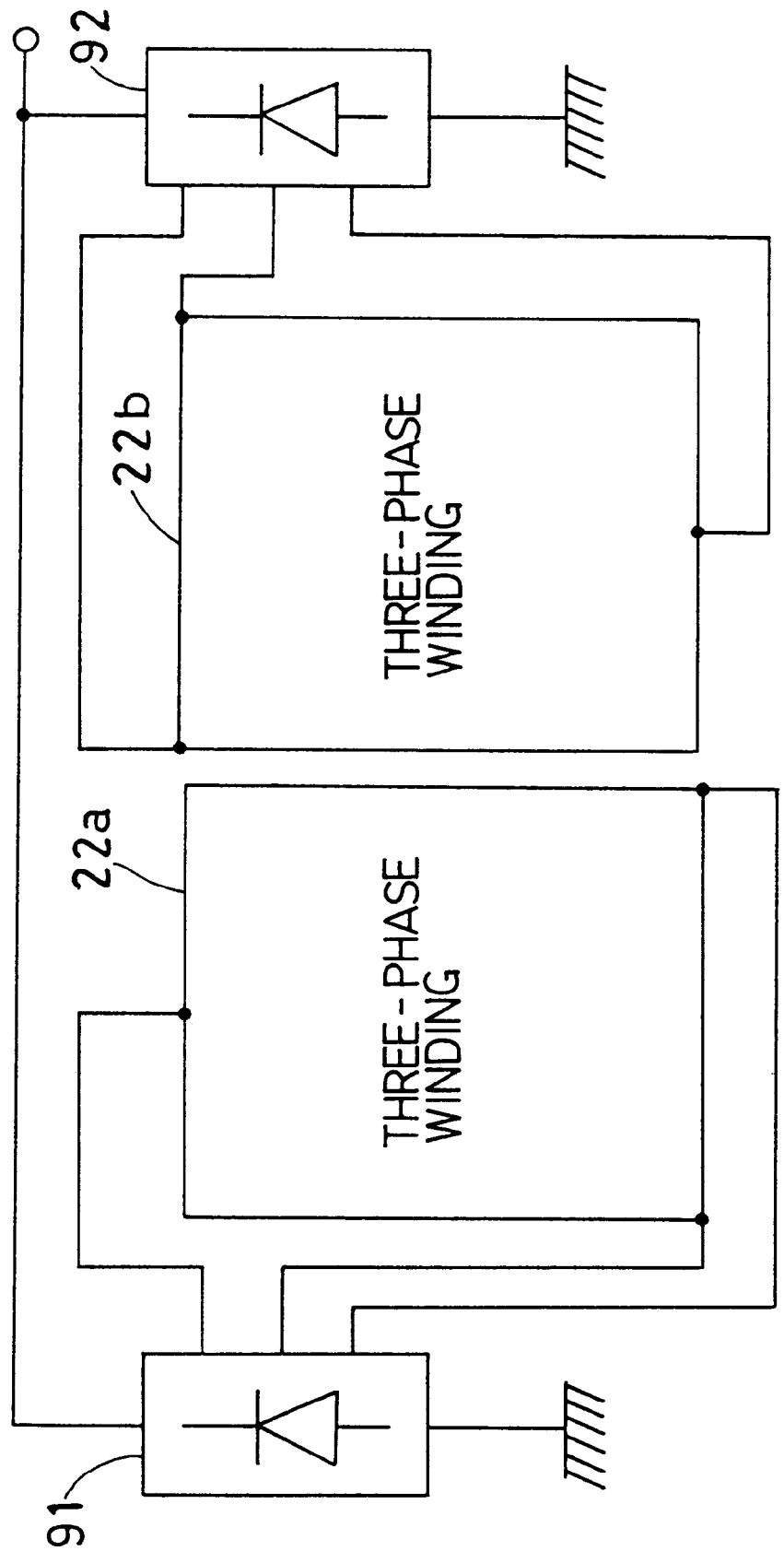
FIG. 11 is a circuit diagram of the stator windings and rectifying circuits.
Figure 12A:
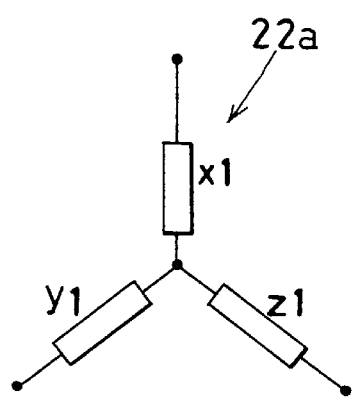
FIGS. 12A, 12B, 12C and 12D are schematic diagrams showing types of the coil connection.
Figure 12B:
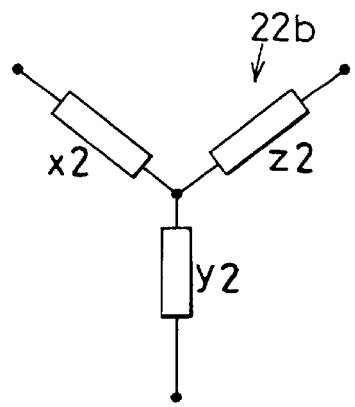
Figure 12C:
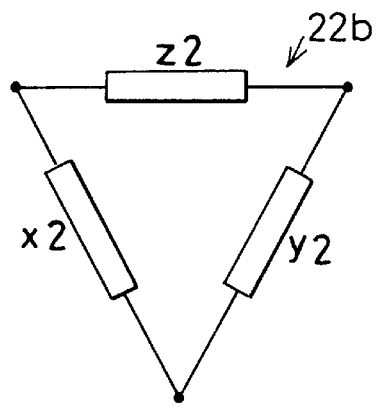
Figure 12D:
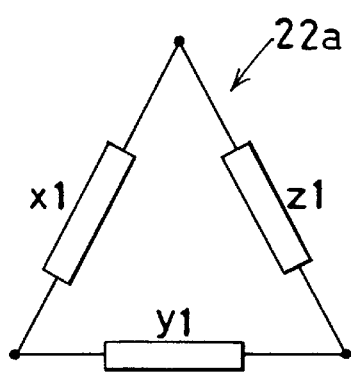

In the first embodiment, as shown in FIG. 11, a first rectifying bridge circuit 91 and a second rectifying bridge circuit 92 rectify respectively the three-phase alternating currents generated by the three-phase windings 22a and 22b. The two three-phase stator windings 22a and 22b may have Y-connected coils or Δ-connected coils, as shown in FIGS. 12A–12D, which correspond to the three-phase output terminals shown in FIG. 11.

Figure 13:
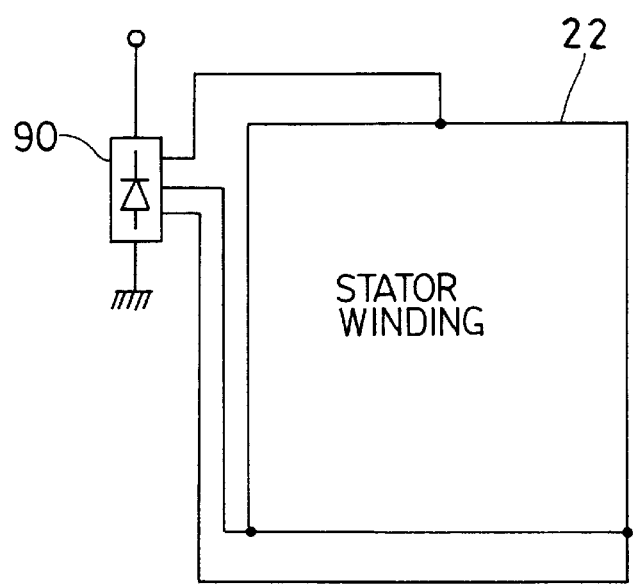
FIG. 13 is a circuit diagram of the stator winding and the rectifying circuit.

In the first embodiment, as shown in FIG. 13, a single rectifying unit 90 can be connected to the stator winding 22 having six coils. In this case, two coils of the same phase is connected in series to form the stator winding 22 of the Y-connection or Δ-connection as shown in FIGS. 14A and 14B. Two coils of the same phase can be disposed opposite sides as shown in FIG. 14C.

Second Embodiment

In a second embodiment, the stator winding 22 is composed of a first three-phase winding 22c having full-pitch-wound coils x1, y1 and z1 and a second three-phase winding 22d having full-pitch-wound coils x2, y2 and z2 which are shifted from the coils x1, y1 and z1 by π/6 radian in the electric angle respectively as shown in FIG. 15.

Connection of the stator winding and the rectifying unit is described next.

Figure 17:
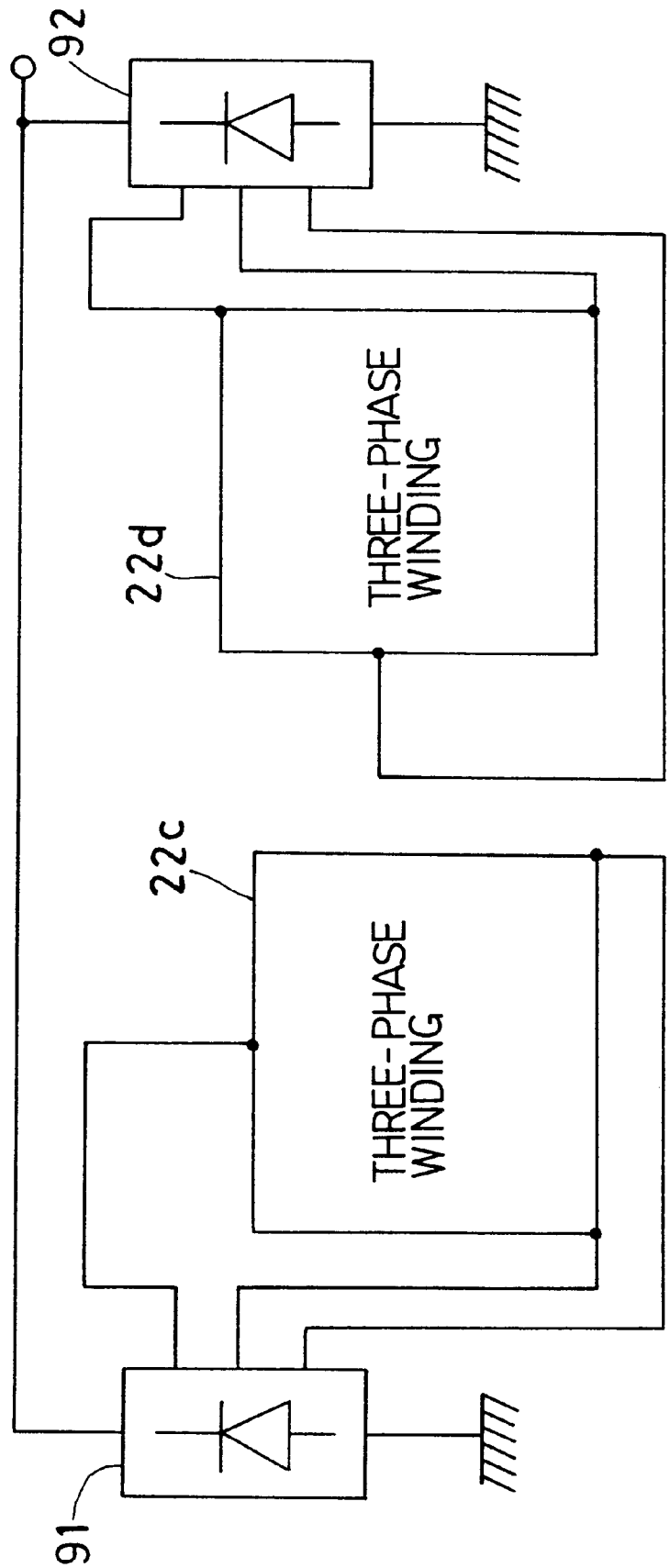
FIG. 17 is a circuit diagram of the stator windings and the rectifying circuits (Second embodiment)
Figure 18A:
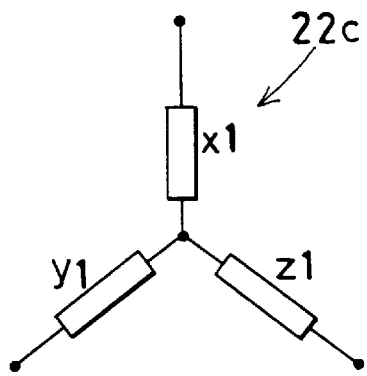
FIGS. 18A, 18B 18C and 18D are schematic diagrams showing types of the coil connection (Second Embodiment)
Figure 18B:
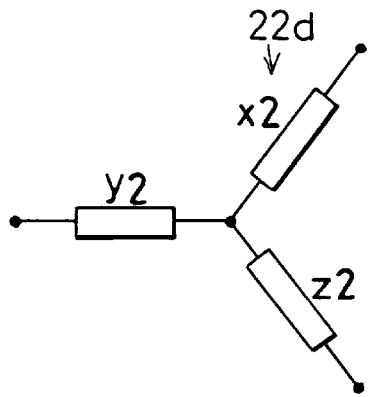
Figure 18C:
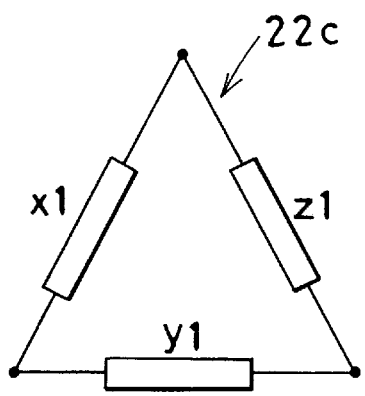
Figure 18D:
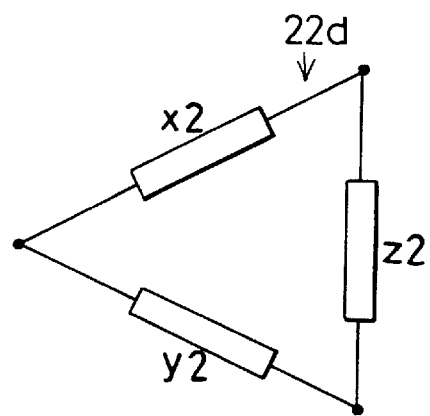
Figure 19:
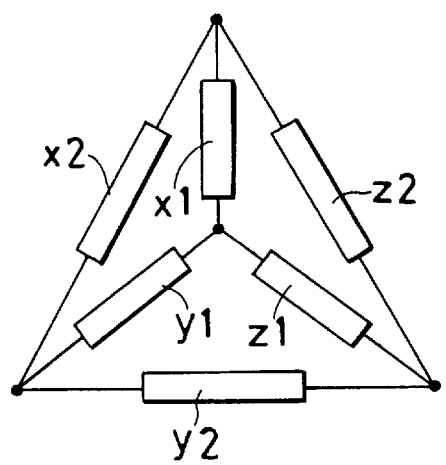
FIG. 19 is a schematic diagram showing a coil connection (second Embodiment)

In the second embodiment, as shown in FIG. 17, a first rectifying unit 91 and a second rectifying unit 92 are respectively connected to the three-phase windings 22c and 22d. In this case, the three-phase windings 22c and 22d have the Y-connected or Δ-connected coils as shown in FIGS. 18A–18D which correspond to three output terminals shown in FIG. 17.

Figure 20:
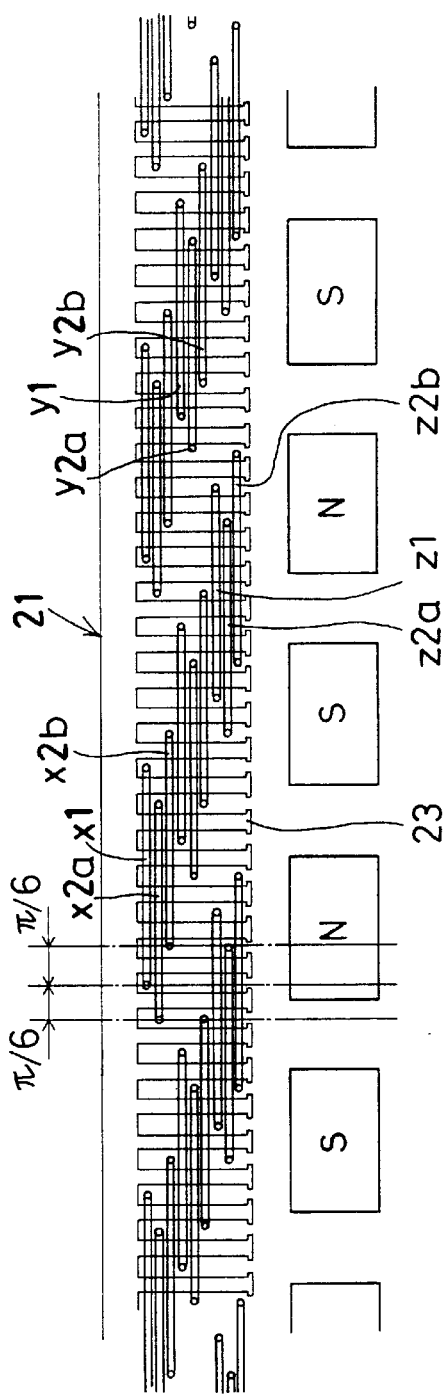
FIG. 20 is a schematic diagram of the stator winding (Second Embodiment)
Figure 22:
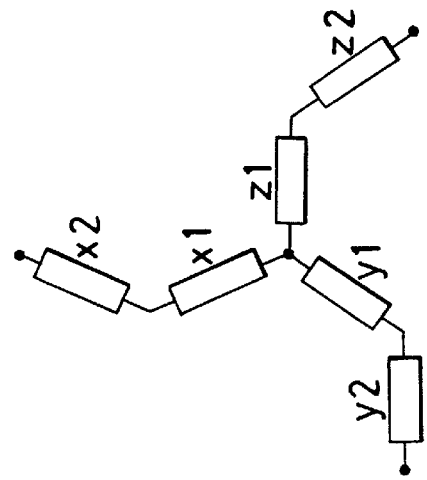
FIG. 22 is a schematic diagram showing a coil connection (second Embodiment)
Figure 21:
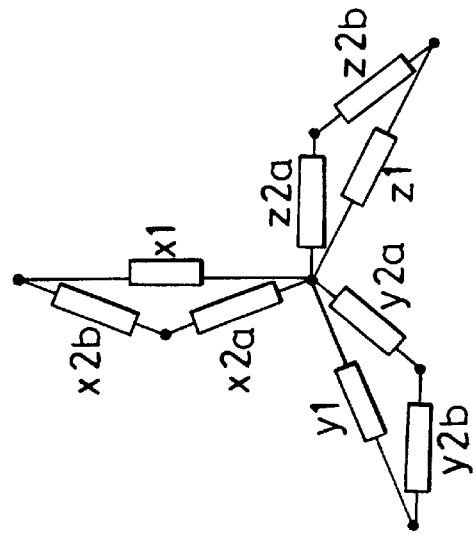
FIG. 21 is a schematic diagram showing a coil connection (second Embodiment)
Figure 23:
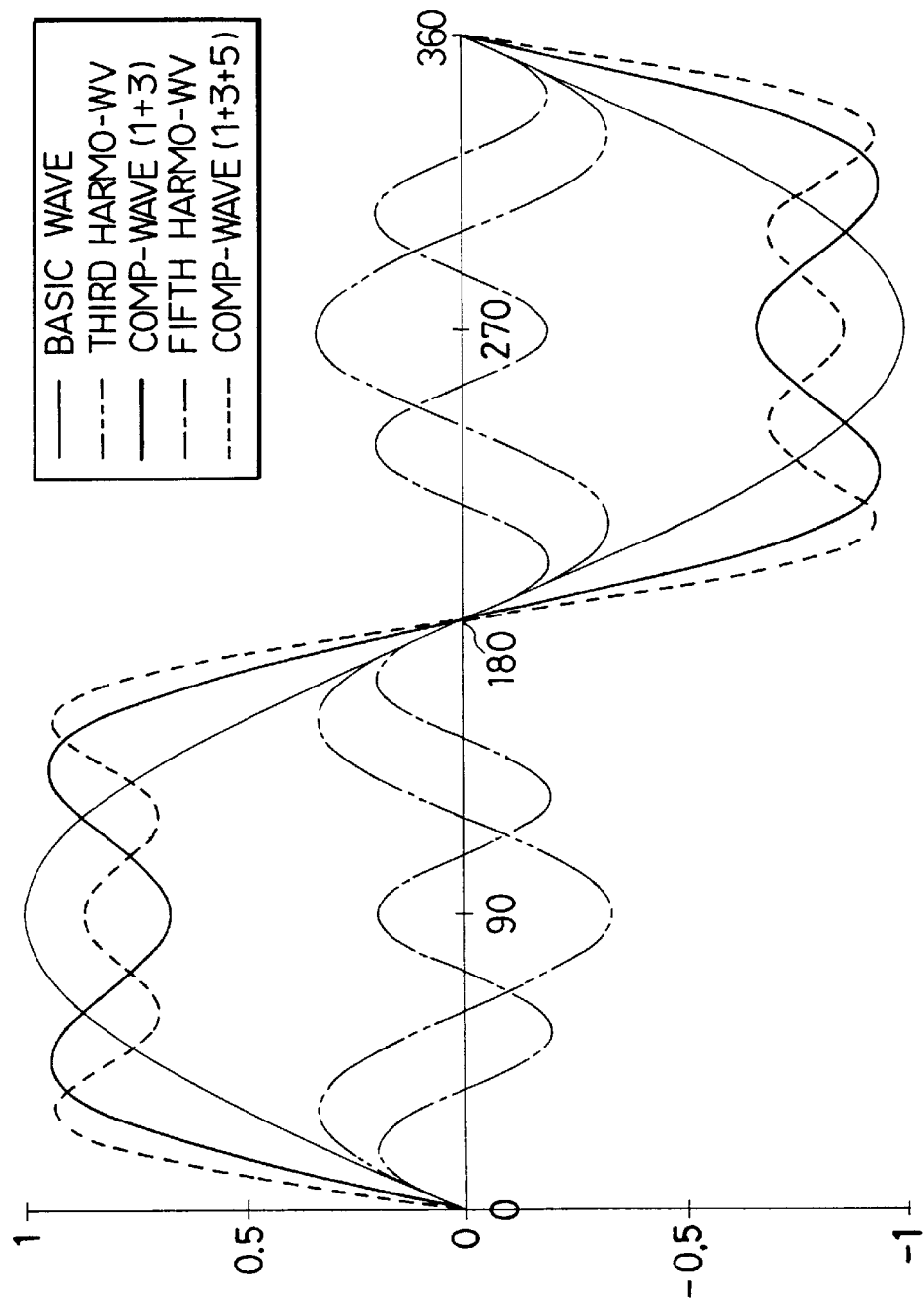
FIG. 23 is a graph showing harmonics (Prior Art)

In the second embodiment, as shown in FIG. 13, a single rectifying bridge circuit 90 can be connected to the stator winding 22 which has six coils. In this case, one of the three-phase windings can have the Y-connected coils with the other having the Δ-connected coils. Each phase coil of one of the three-phase windings can be divided into two coils and shifted from the phase coils of the other three-phase winding by π/6 radian in the electric angle and connected as shown in FIG. 20. They can be connected zigzag in series as shown in FIG. 21. In FIG. 21, each phase coil of the second three-phase winding 22d is divided into two, that is, (x2a, x2b), (y2a, y2b) or (z2a, z2b). The stator winding 22 having the above phase coils is connected to the rectifying unit 90 as shown in FIG. 13. In this case, each neutral point of the first and second three-phase windings can be separated.

The change of the magnetomotiveforce caused by the stator is described next.

Figure 24A:
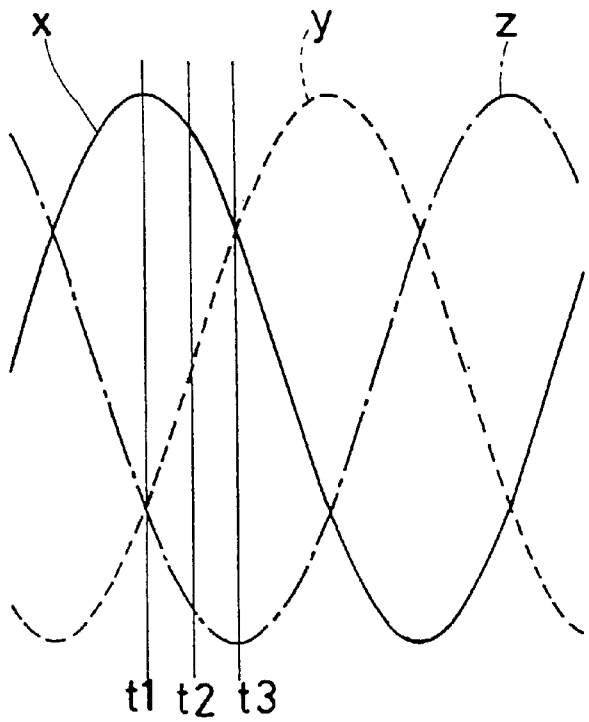
FIGS. 24A, 24B, 24C and 24D are graphs showing changes in the magnetic flux (Prior Art)
Figure 24B:
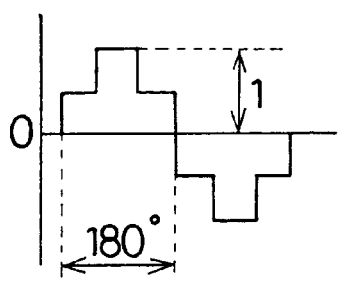
Figure 24C:
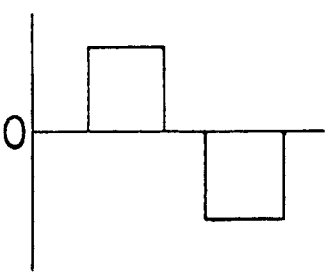
Figure 24D:
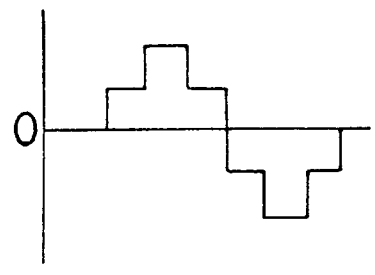
Figure 25:
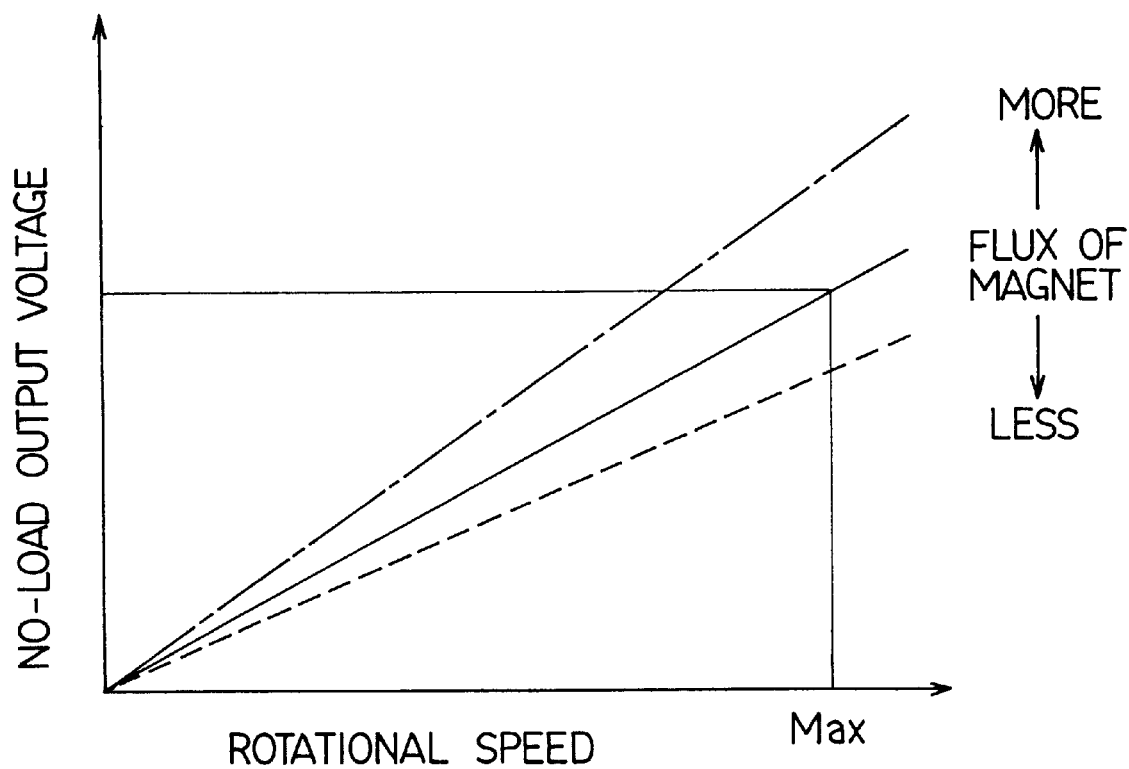
FIG. 25 is a graph showing the output voltage of a generator at no-load operation (Prior Art).

FIG. 24A is a graph showing current waves of a conventional generator, FIGS. 24B, 24C and 24D show the distribution of the magnetomotive force at time t=t1, t2 and t3 respectively, that is, at 0, 30 and 60 degree in the electric angle of the current wave respectively.

If the three-phase winding generates the three-phase current shown in FIG. 24A and the distribution of the magnetomotive force is illustrated in the rectangular shape, the composite magnetomotive force per pair of N-S poles of the three-phase winding of the stator at t=t1 is illustrated in FIG. 24B. As shown in FIGS. 24B–14D, the distribution of the magnetomotive force of the stator relative to the rotor changes with the time=t1, t2 and t3 or with the electric angle 0, 30 and 60 in degree. The distribution of the magnetomotive force changes in a cycle from t1 to t3 or 60 degree in the electric angle.

Figure 7A:
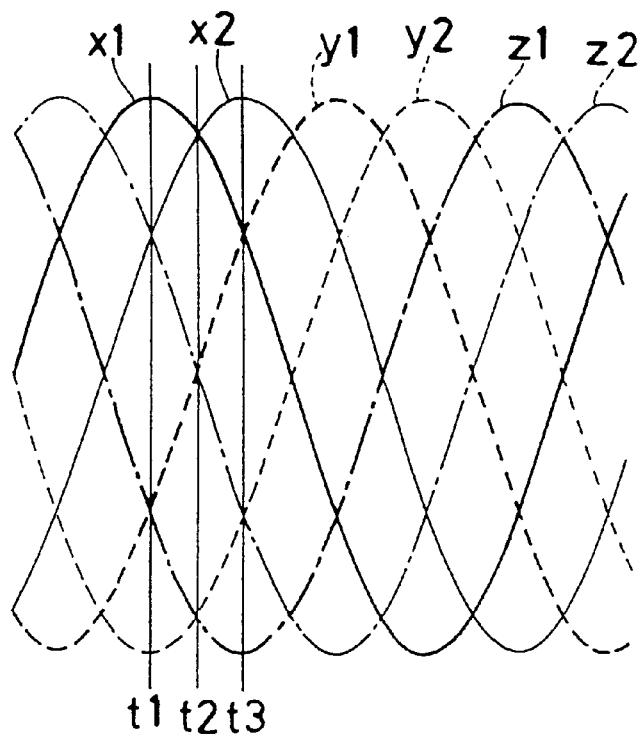
FIGS. 7A, 7B, 7C and 7D are graphs showing changes in the magnetic flux (Prior Art)
Figures 7B, 7C, 7D:
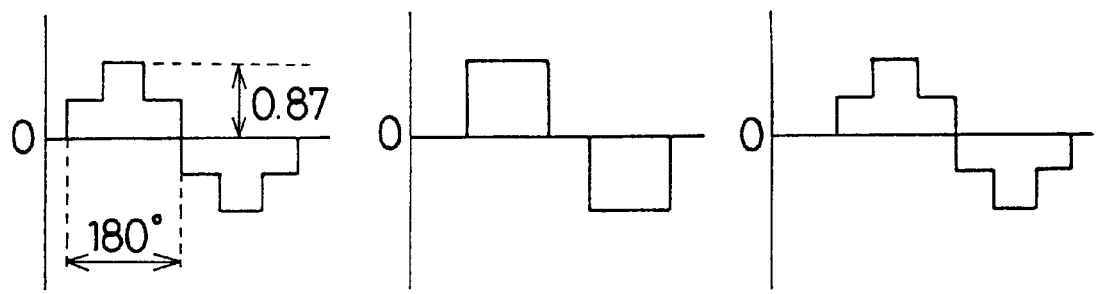

On the other hand, the magnetomotive force (magnetic disturbance) of the stator winding according to the first embodiment is shown in FIG. 7. FIG. 7A is a graph showing the current wave, and FIGS. 7B, 7C and 7D are graph showing the magnetomotive force at time t1, t2 and t3, or 0, 30 and 60 degree in the electric angle of the current wave respectively.

In this case, the change of the magnetomotive force is decreased to 87% of the change of the same of the conventional stator winding shown in FIGS. 24B, 24C and 24D.

FIGS. 16A is a graph illustrating the electric current wave, and FIGS. 16B–16D are graphs illustrating the distribution of the magnetomotive force at time t1, t2 and t3 or 0, 30 and 60 degree in the electric angle of the current wave respectively. In this case, the distribution of the magnetomotive force is the same at the time t1, t2 and t3. In other words, no change exists in the magnetomotive force which affects the rotor.

What is claimed is:

1. An AC generator for a vehicle comprising:

a rotor having a core with a plurality of claw pole pieces disposed on an outer periphery thereof at a pitch, a stator disposed around said rotor and having a stator core with a plurality of slots in an inner periphery thereof and a stator winding disposed in said slots and wound in said stator core; and a permanent magnet, disposed between an adjacent two of said claw pole pieces in the rotating direction and magnetized in a polarity to reduce leakage flux between said claw pole pieces; wherein said stator winding comprises a plurality of three-phase windings, each of said three-phase windings is disposed in said slots at a certain phase angle, and said stator winding comprises a first three-phase winding having a plurality of first short-pitch-lap-wound coils and a second three-phase winding having a plurality of second short-pitch-lap-wound coils respectively shifted from said first short-pitch coils by $\pi/3$ radian in the electric angle.

2. An AC generator for a vehicle comprising:

a rotor having a core with a plurality of claw pole pieces disposed on an outer periphery thereof;

a stator disposed around said rotor and having a stator core with a plurality of slots in an inner periphery thereof and a stator winding disposed in said slots and wound in said stator core; and a permanent magnet, fixed to at least one of said claw pole pieces and magnetized in a polarity to reduce leakage flux between said claw pole pieces; wherein said stator winding comprises a first three-phase winding having a plurality of first short-pitch-lap-wound coils and a second three-phase winding having a plurality of second short-pitch-lap-wound coils respectively shifted from said first short-pitch-lap-wound-coils by an electric angle that is one of $\pi/6$ radian and a multiple of $\pi/6$ radian.

3. An AC generator for a vehicle as claimed in claim 2, wherein said electric angle is $\pi/6$ radian.

4. An AC generator as for a vehicle as claimed in claim 2, wherein said electric angle is $\pi/3$ radian.

* * * * *